United States Patent
Wedig et al.

(10) Patent No.: US 11,495,118 B2
(45) Date of Patent: Nov. 8, 2022

(54) AUGMENTED REALITY OF A BUILDING

(71) Applicant: ONEEVENT TECHNOLOGIES, INC., Mount Horeb, WI (US)

(72) Inventors: Kurt Joseph Wedig, Mount Horeb, WI (US); Daniel Ralph Parent, Mount Horeb, WI (US)

(73) Assignee: OneEvent Technologies, Inc., Mount Horeb, WI (US)

( * ) Notice: Subject to any disclaimer, the term of this patent is extended or adjusted under 35 U.S.C. 154(b) by 0 days.

(21) Appl. No.: 16/019,366

(22) Filed: Jun. 26, 2018

(65) Prior Publication Data

US 2019/0096232 A1    Mar. 28, 2019

Related U.S. Application Data

(60) Provisional application No. 62/525,496, filed on Jun. 27, 2017.

(51) Int. Cl.
| | |
|---|---|
| *H04N 7/18* | (2006.01) |
| *G08B 27/00* | (2006.01) |
| *G08B 17/00* | (2006.01) |
| *G08B 13/196* | (2006.01) |

(52) U.S. Cl.
CPC ........... *G08B 27/001* (2013.01); *G08B 17/00* (2013.01); *H04N 7/181* (2013.01); *H04N 7/185* (2013.01); *G08B 13/1965* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,619,996 | B1* | 4/2017 | Smith | G08B 27/001 |
| 10,102,586 | B1* | 10/2018 | Marlow | G06Q 40/08 |
| 10,310,464 | B1* | 6/2019 | Lu | G05B 15/02 |
| 2002/0196202 | A1* | 12/2002 | Bastian | G09G 3/003 |
| | | | | 345/8 |
| 2013/0053063 | A1* | 2/2013 | McSheffrey | H04W 64/006 |
| | | | | 455/456.1 |
| 2013/0054187 | A1* | 2/2013 | Pochiraju | G01S 17/89 |
| | | | | 702/150 |
| 2013/0169681 | A1* | 7/2013 | Rasane | G06Q 50/10 |
| | | | | 345/633 |

(Continued)

FOREIGN PATENT DOCUMENTS

| | | | |
|---|---|---|---|
| CN | 202205313 U | * | 4/2012 |
| KR | 20160118515 A | * | 10/2016 |
| KR | 101725774 B1 | * | 4/2017 |

OTHER PUBLICATIONS

Ahn et al., RescueMe: An Indoor Mobile Augmented-Reality Evacuation System by Personalized Pedometry, 2011, IEEE Asia-Pacific Computing Conference, pp. 70-77 (Year: 2011).*

*Primary Examiner* — Andrew G Yang (57) ABSTRACT

The present disclosure relates to an augmented reality system including one or more of a building, sensor(s), a gateway, a server, and a monitoring computer. The augmented reality system may further includes drones that capture video or other images of the building. The monitoring computer gathers information from the sensor(s) and/or drones and facilitates the creation of an augmented view of the building to provide intelligence to emergency responders.

21 Claims, 4 Drawing Sheets

(56) References Cited

U.S. PATENT DOCUMENTS

| | | | | |
|---|---|---|---|---|
| 2015/0309316 A1* | 10/2015 | Osterhout | ............... | G06F 3/012 |
| | | | | 345/8 |
| 2015/0332515 A1* | 11/2015 | Elmekies | ............... | G06F 3/017 |
| | | | | 345/419 |
| 2016/0035246 A1* | 2/2016 | Curtis | .................... | H04L 67/10 |
| | | | | 434/219 |
| 2016/0327946 A1* | 11/2016 | Koga | .................... | B64C 39/024 |
| 2016/0378109 A1* | 12/2016 | Raffa | .................. | G08G 5/0013 |
| | | | | 701/2 |
| 2017/0053169 A1* | 2/2017 | Cuban | .................... | H04N 7/185 |
| 2017/0092109 A1* | 3/2017 | Trundle | ............... | B60L 53/305 |
| 2017/0108838 A1* | 4/2017 | Todeschini | ............ | G05B 15/02 |
| 2017/0109940 A1* | 4/2017 | Guo | ........................ | G06T 19/20 |
| 2017/0161561 A1* | 6/2017 | Marty | ............... | H04N 5/23238 |
| 2017/0187993 A1* | 6/2017 | Martch | .................... | G01S 1/00 |
| 2017/0225321 A1* | 8/2017 | Deyle | .................... | B25J 9/1679 |
| 2017/0243400 A1* | 8/2017 | Skidmore | ........... | G06F 3/04842 |
| 2018/0018823 A1* | 1/2018 | Cianciolo | ............. | H04N 7/183 |
| 2018/0046187 A1* | 2/2018 | Martirosyan | ........ | G05D 1/0094 |
| 2018/0122246 A1* | 5/2018 | Clark | .................... | G06K 9/0063 |
| 2018/0151045 A1* | 5/2018 | Kim | ........................ | G08B 21/02 |
| 2018/0321692 A1* | 11/2018 | Castillo-Effen | ....... | G06T 19/003 |
| 2018/0365785 A1* | 12/2018 | Boss | .................... | G06Q 50/265 |
| 2019/0088022 A1* | 3/2019 | Ochiai | ............. | G05B 19/41865 |

* cited by examiner

AUGMENTED REALITY OF A BUILDING

BACKGROUND

The following description is provided to assist the understanding of the reader. None of the information provided or references cited is admitted to be prior art. Most building structures are prone to catching fire. These building structures may be equipped with one or more smoke sensors. In the event of a fire, the smoke sensors are configured to detect smoke and sound an audible alarm. Even with the alarm, occupants may be trapped within the building structure and may need to be rescued. Not knowing the layout of the building structure and where the occupants are trapped within the building, the rescue of the occupants may take a long time. The layout of the building may even change as the fire spreads within the building, further complicating rescue efforts. In some cases, the occupants are not able to be rescued primarily due to the treacherous, hazardous, and rapidly changing conditions within the building structure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Buildings such as homes, schools, theatres, office buildings, warehouses, etc. often include devices that monitor one or more conditions of the building. For example, smoke sensors can detect a level of smoke in a room, occupancy sensors can detect the number of people in a space, temperature sensors can detect the temperature of a room, etc. Such sensors can be configured to monitor for undesirable conditions such as a fire, high levels of toxic or explosive gasses (e.g., carbon monoxide, methane, etc.), floods, high levels of humidity, etc. The sensors can transmit information regarding their sensed conditions to a central processing system that can monitor the information and detect the undesirable conditions.

Once the undesirable conditions are detected by the central processing system, appropriate personnel can be contacted and notified. For example, a homeowner or a police station can be contacted when the system detects an intruder. In another example, the fire department can be notified if a fire is detected. However, real-time data from the sensors may not be available to emergency personnel during the undesirable condition. For example, once a fire truck arrives at a building with a fire, the firemen may know that there is a fire, but they may not know details about the condition such as which rooms are on fire, where people are located within the building, what the floorplan of the building is, etc. Various embodiments described herein facilitate transmission and effective communication of the data detected by the sensors to the emergency personnel.

In an illustrative embodiment, once emergency personnel arrive at a building with various sensors, the emergency personnel can deploy drones to gather the information from the sensors. For example, the sensors may wirelessly transmit information such as temperature, occupancy, smoke, etc. The drones can fly or otherwise maneuver into positions that are close enough to the sensors to detect the wireless transmissions. The drones can transmit the information to a computing system available to the emergency personnel. The computing system can compile the various information into a virtual environment that provides an augmented reality to the emergency personnel. The virtual environment can help facilitate the emergency personnel to most effectively handle the undesirable conditions.

Figure 1:
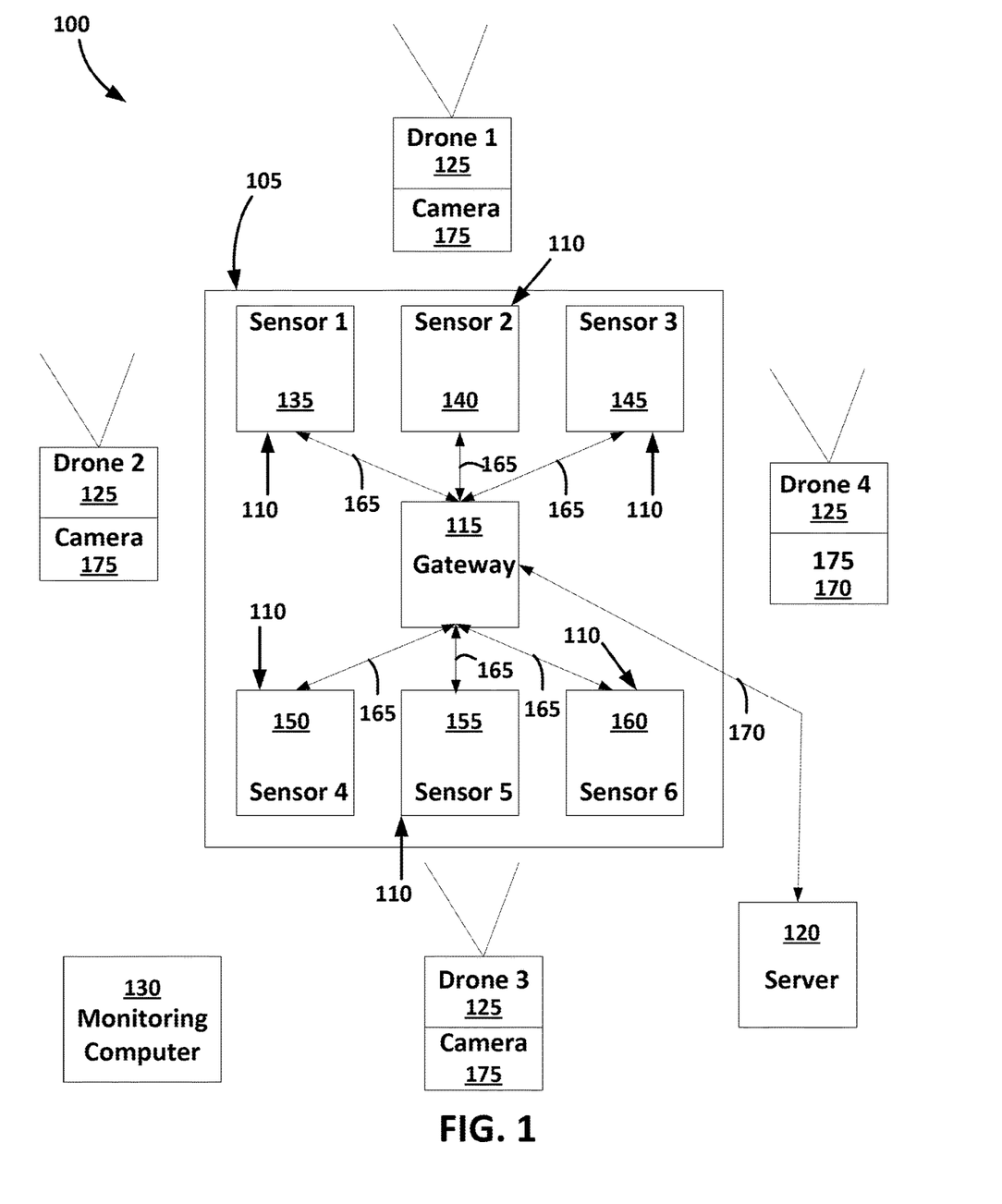
FIG. 1 is a block diagram of an augmented reality system of a building, in accordance with at least some embodiments of the present disclosure.

Referring now to FIG. 1, an illustrative block diagram of an augmented reality system 100 is shown, in accordance with at least some embodiments of the present disclosure. The augmented reality system 100, as illustrated, includes a building 105, sensors 110, a gateway 115, a server 120, drones 125, and a monitoring computer 130. In alternative embodiments, additional, fewer, and/or different elements may be used.

The augmented reality system 100 is implemented in the building 105. Within the building 105, the augmented reality system 100 includes the sensors 110 such as sensors 135, 140, 145, 150, 155, and 160. In an illustrative embodiment, the sensors 110 are located throughout the building. In alternative embodiments, the sensor 110 can be located in strategic locations based on the conditions monitored. For example, a water level sensor can be located in a basement to monitor for flooding of the basement. In the embodiment illustrated in FIG. 1, six of the sensors 110 are shown. However, in alternative embodiments, any suitable number of sensors may be used such as greater than six or fewer than six.

Each of the sensors 135, 140, 145, 150, 155, and 160 are configured to communicate with the gateway 115 via communication links 165 to transfer data collected by the sensors to the gateway. The sensors 135, 140, 145, 150, 155, and 160 may communicate any suitable information to the gateway. For example, each of the sensors 135, 140, 145, 150, 155, and 160 can communicate an identification (ID) of the respective sensor and an indication of the condition sensed by the respective sensor (e.g., a temperature, a humidity level, a level of smoke obscuration, etc.).

In an illustrative embodiment, the gateway 115 communicates with the server 120, via communication link 170, to transmit the sensor data received from the sensors 135, 140, 145, 150, 155, and 160 for further processing and cataloguing. In the embodiment shown in FIG. 1, the server 120 is remote from the building 105. For example, the server 120 may be implemented in a cloud-based computing system. In alternative embodiments, the server 120 may be located within the building 105. For example, the gateway 115 and the server 120 may be implemented in a single device that communicates with the sensors 135, 140, 145, 150, 155, and 160 to process the information from the sensors.

The augmented reality system 100 also includes the drones 125 that are used to capture videos and/or images of the building 105 during an emergency. In an illustrative embodiment, the videos or images are used to help devise an emergency response plan, as discussed further below. The drones 125 may also be used to capture information transmitted from the sensors 135, 140, 145, 150, 155, and 160. The drones 125 may transmit the sensor information and the images to the monitoring computer 130. The monitoring computer 130 can gather the information and present the information to users (e.g., emergency personnel) in a manner that provides the users with an augmented reality of the building 105.

It is to be understood that only some components of the augmented reality system 100 are shown herein and that several other components, such as, routing mechanisms, wiring, processing units, installation units, etc. may be used and are within the scope of the present disclosure. Likewise, although not shown, the building 105 may have walls, a roof, windows, doors, a foundation, and other features found in buildings. Furthermore, the building 105 may be any of a variety of structures such as residential houses, commercial buildings, warehouses, hospitals, stores, factories, hotels, arenas, stadiums, and any other suitable building. While the present disclosure has been described for the building 105, in other embodiments, the present disclosure may be implemented in any other structure that is substantially permanent or temporary, such as tunnels, caves, tents, stages, or any structure that is monitored by the sensors 110.

With respect to the sensors 135, 140, 145, 150, 155, and 160, in some embodiments, the sensor 135 is a smoke sensor that is used to detect smoke in the building 105, the sensor 140 is a motion sensor that is used to detect the presence of people or pets in the building in case of fire, the sensor 145 is a door sensor to determine the status of doors (e.g., open, closed, locked, unlocked, etc.) throughout the building, and the sensor 150 is a window sensor to determine the status of windows throughout the building. Likewise, in some embodiments, the sensor 155 is a temperature sensor to detect the temperature of a room and the sensor 160 is a wind sensor to determine the direction of wind in and/or around the building. Notwithstanding that the sensors 135, 140, 145, 150, 155, and 160 have been described as being a specific type of sensor, in other embodiments, other or additional types of sensors, such as, stair sensors, carbon monoxide sensors, location sensors, proximity sensors, pressure sensors, water sensors, humidity sensors, smoke obscuration sensors, and any other type of sensor that may be needed or desirable to have to get information in case of a fire in the building 105, may be used.

Further, although only one instance of each of the sensors 135, 140, 145, 150, 155, and 160 is shown in the augmented reality system 100 of FIG. 1, in at least some embodiments, multiple instances of one or more of those sensors 110 may be used in the building 105. Specifically, the number and location of the sensors 135, 140, 145, 150, 155, and 160 within each room or area of the building 105 may depend upon the type of sensor, the type of information that the sensor is configured to collect and convey, and/or the amount of information that may be needed or desirable to have in devising an emergency plan. For example, if the sensor 145, which is a door sensor, is configured to detect the status of a single door, one instance of the sensor 145 may be installed on every (or selected) door(s) of a room or area in the building 105. In another example, if the sensor 145 is designed to determine the status of every door in a room or area of the building 105 (e.g., by detecting doors within a pre-defined range of the sensor), one only instance of that sensor may be needed in each room or area. Furthermore, if the door in a room or area of the building 105 is a closet door, then the location of that door may not be pertinent to devising fire emergency plan and, therefore, the sensor 145 may not be needed on the closet door.

Likewise, window sensors (e.g., the sensor 150) may be installed on every (or selected) window(s) of the building 105 or only those windows that are on the outside walls of the building. Similarly, one instance of a smoke sensor (e.g., the sensor 135) may be sufficient for every room, in some embodiments. However, for bigger rooms, it may be desirable to have multiple smoke sensors. In some embodiments, multiple instances of a sensor may be installed to merely provide redundancy, such that, in event that one sensor malfunctions, another sensor can keep sensing. Thus, the sensors 135, 140, 145, 150, 155, and 160 may be strategically placed throughout the building 105 to get information from inside the building to effectively and efficiently sense or detect any fires in the building and rescue people, pets, and/or property from inside the building.

Furthermore, each of the sensors 135, 140, 145, 150, 155, and 160 may be designed to withstand temperatures found inside buildings (e.g., the building 105) during fires without being damaged for a specified period of time. For example, in some embodiments, the sensors 135, 140, 145, 150, 155, and 160 may be designed to withstand at least 500° Celsius for at least 30 minutes during fire in the building 105. In other embodiments, the sensors 135, 140, 145, 150, 155, and 160 may be designed with different specifications for temperature and time. Additionally, each of the sensors 135, 140, 145, 150, 155, and 160 may have an identity code that uniquely identifies the sensor and distinguishes that sensor from other types of sensors. The identity code may be transmitted along with the other sensor data. The identity codes may also be made available in a catalog form for operators reviewing the sensor data.

In some embodiments, the identity code may be dependent upon the type of sensor. For example, in some embodiments, all smoke sensor type of sensors may have one kind of identity code, all door sensors may have another type of identity codes, all temperature sensors may have yet another type of identity codes, and so on. Within each type of identity code, additional information may be provided to distinguish multiple instances of the same type of sensor. Thus, for example, two smoke sensors in the building 105 may each have an identity code with two parts—a first part identifying the sensor as a smoke sensor and a second part that distinguishes the first smoke sensor from the second sensor. By virtue of assigning specific codes to specific types of sensors, the operators(s) reviewing the sensor data are able to determine from the identity code the type of sensor and how to interpret the data being transmitted from that sensor. The operators(s) may also be able to sort and arrange data based upon the type of sensor to most effectively and efficiently devise the emergency rescue plan for any occupants of the building 105.

Furthermore, in some embodiments, the identity code may also include information identifying the location of each of the sensors 135, 140, 145, 150, 155, and 160. In other embodiments, the location information of the sensors 135, 140, 145, 150, 155, and 160 may be provided separately from the identity codes. In some embodiments, the location may be global positioning system (GPS) coordinates. In other embodiments, if the floorplan of the building 105 is known, the location may be a description of the location of the sensors 135, 140, 145, 150, 155, and 160. For example, a location description of a door sensor (e.g., the sensor 145) may be "front entrance on the main floor" or "entrance into the basement," etc. By virtue of knowing the location of each sensor, the operator(s) may be able to review the data from various sensors to determine fire patterns, how fire is spreading, and which areas to focus rescue efforts on. The location of the sensors 135, 140, 145, 150, 155, and 160 may also be catalogued, either as part of the identity code or separately, whichever the case may be, and made available to the operator(s).

In an illustrative embodiment, the sensors 135, 140, 145, 150, 155, and 160 transmit sensor data to the gateway 115. In some embodiments, one instance of the gateway 115 can be provided in each room or area of the building 105, while in other embodiments, one instance of the gateway may be sufficient for the entire building 105. In yet other embodiments, multiple instances of the gateway 115 may be desirable in each room or area of the building 105. The number of the gateways (e.g., the gateway 115), as well as the positioning of the gateways within the building 105 may vary based on the operating range of the gateway and its ability to collect sensor data from the sensors 135, 140, 145, 150, 155, and 160. In an illustrative embodiment, similar to the description above of the sensors 135, 140, 145, 150, 155, and 160, the gateway 115 may be designed to withstand high temperatures for a specified period of time to enable the gateway to keep collecting and transmitting sensor data from the sensors 135, 140, 145, 150, 155, and 160 in case of fire.

Furthermore, in some embodiments, the gateway 115 may be configured to transmit the sensor data from the sensors 135, 140, 145, 150, 155, and 160 instantaneously (or substantially instantaneously) as the sensor data is received from the sensors. In other embodiments, the gateway may be configured to transmit the sensor data periodically. Likewise, the sensors 135, 140, 145, 150, 155, and 160 may be configured to either sense their assigned condition constantly or periodically, as programmed within the sensors. In some embodiments, the gateway 115 is configured to direct the sensors 135, 140, 145, 150, 155, and 160 to collect sensor data and transmit that data to the gateway.

In an illustrative embodiment, the sensors 135, 140, 145, 150, 155, and 160 may transmit information to the gateway 115 while in communication with the gateway 115. If communication is interrupted, the sensors 135, 140, 145, 150, 155, and 160 can buffer sensed information (e.g., along with a timecode) and can transmit the buffered information to the gateway 115 when communication is reestablished. Similarly, in an illustrative embodiment, the gateway 115 can transmit received sensor information to the server 120 while communication with the server. If the communication path is interrupted, the gateway 115 can buffer the sensor information. The gateway 115 can transmit the buffered information to the server 120 once communication with the server is reestablished.

The sensors 135, 140, 145, 150, 155, and 160 and the gateway 115 can communicate with each other via the communication links 165. The communication links 165 may be any of a variety of communication channels or interfaces. The communication links 165 may be of any type that is suitable for communicating with other sensors and/or the gateway 115. For example, one or more of the communication links 165 may be wired communication links (e.g., jacks, antennas, transmitters, receivers, transceivers, wire terminals, electrical cables and connectors, etc.) that communicate via wired communication protocols, such as TCP/IP, BACnet IP, BACnet MSTP, CAN, Modbus, USB, Firewire, UART, SPI, RS-485, a public switched telephone network (PSTN), or other wired protocols.

Likewise, one or more of the communication links 165 may instead be wireless and communicate via one or more wireless communication protocols, such as Wi-Fi (including TCP/IP), Wi-Max, Bluetooth, LoRa, NFC, Zigbee, and the like. In some embodiments, one or more of the communication links 165 may include cellular or mobile phone communications, wireless radio channels, local area network (LAN), metropolitan area network (MAN), wide area network (WAN), world wide web (WWW) or the Internet, and the like. A combination of one or more communication interfaces discussed above may be used for the communication links 165 as well, in some embodiments. The communication links 165 may also be a distributed intelligent network, in some embodiments. Further and similar to the sensors 135, 140, 145, 150, 155, and 160 and the gateway 115, the communication links 165 are designed to operate in high temperatures found in case of a fire within the building 105 for a specified period of time.

In addition to the sensors 135, 140, 145, 150, 155, and 160 communicating with the gateway 115, in some embodiments, the sensors can also communicate with each other. For example, if the sensors sense periodically and if one smoke sensor detects smoke in a room, that smoke sensor may alert other smoke sensors in the building to increase frequency of sensing. Likewise, if the communication link 165 between a particular one of the sensors 135, 140, 145, 150, 155, and 160 and the gateway 115 malfunctions, the sensor can transmit its sensed data to another sensor, which may then transmit the other's sensor's data to the gateway. Thus, by enabling the sensors 135, 140, 145, 150, 155, and 160 to communicate with one another, the augmented reality system 100 provides redundancy in the system to account for malfunctions in the system. Such a network may be a self-healing network.

The gateway 115, in some embodiments, is also configured to include an identity code and a location code. The identity and location codes of the gateway 115 may be useful when multiple instances of the gateway 115 are installed within the building 105. In some embodiments, the location code of the gateway 115 may be part of the identity code. In some embodiments, the gateway 115 may transmit the identity code (and the location code if not part of the identity code) to the server 120 along with each transmission of the sensor data. Alternatively or additionally, the identity code and the location code may be catalogued and made available to the operator(s).

In some embodiments, the gateway 115 may be programmed to automatically communicate with an emergency response center (not shown) if the gateway receives certain types of information from the sensors 135, 140, 145, 150, 155, and 160. For example, if the gateway 115 receives sensor data that indicates that the temperature in a room or area of the building 105 is significantly high and the data from smoke sensor sensors detects smoke in the same room or building, the gateway 115 may conclude that the room or area of the building is on fire. The gateway 115 may then automatically communicate with an emergency response center. Conditions that may cause the gateway 115 to contact the emergency response center may be programmed within the gateway. The emergency response center may include a 911 call center, a fire department, police department, other emergency response service, or a combination thereof. In an alternative embodiment, the gateway 115 may not include such programming, and the server 120 may analyze the information and automatically contact emergency personnel.

In an illustrative embodiment, the gateway 115 transmits the sensor data from the sensors 135, 140, 145, 150, 155, and 160 to the server 120 via the communication link 170. The communication link 170 can be any suitable communication link, such as any of the communication protocols mentioned above with respect to the communication links 165. In an illustrative embodiment, the communication link 170 is a wireless cellular link. In some embodiments, the sensors 135, 140, 145, 150, 155, and 160 may also be configured to bypass the gateway 115 and communicate directly with the server 120. Such a functionality may be used, for example, when the gateway 115 malfunctions or one or more of the communication links 165 are ineffective. In such an example, the sensors 135, 140, 145, 150, 155, and 160 can transmit the sensor data directly to the server 120 via communication links that are similar to the communication link 170 (e.g., via cellular communications). The server 120 may be located in a remote location (such as the emergency response center or a cloud computing network) or another location accessible by multiple emergency response centers. Data transmitted to the server 120 may be stored in a cloud storage. In other embodiments, other or additional mechanisms to store, manage, and back-up data may be used. Further, although not shown, multiple augmented reality systems (e.g., the augmented reality system 100) connected to various other buildings and structures may be connected to the server and store data in the cloud storage.

In an illustrative embodiment, the server 120 includes a variety of computing elements. For example, the server 120 may include memory having one or more devices (e.g., memory units, memory devices, storage devices, etc.) for storing data and/or computer code for completing and/or facilitating various processes described in the present disclosure. Such memory may include volatile and/or non-volatile memory including, random access memory (RAM), read-only memory (ROM), dynamic random access memory (DRAM), programmable read only memory (PROM), erasable programmable read only memory (EPROM), electrically erasable programmable read only memory (EEPROM), flash memory, hard drive storage, optical memory, or any other suitable memory for storing data, software objects and/or computer instructions. Memory may also include database components, object code components, script components, or any other type of information structure for supporting the various activities and information structures described in the present disclosure. Other types of storage media, for example, compact disc (CD), digital video disc (DVD), floppy discs, Blu-ray discs, magnetic storage, computer readable media, or other electronic storage media, may be used within or in conjunction with the memory of the server 120.

In an illustrative embodiment, the server 120 includes a processing unit capable of executing computer code for running one or more processes described herein. In some embodiments, the processing unit may include a digital signal processor (DSP), such as, a general-purpose stand alone or embedded processor, or a specialized processing unit. In general, processing unit of the server 120 may be of any type that is suitable for a server system. Additionally, in at least some embodiments, multiple instances of the processing unit may be connected together at least indirectly and utilized in combination with one another to perform various functions described herein. Multiple server units in communication with one another may also be used in other embodiments.

The processing unit(s) of the server 120 may be configured to process a variety of program instructions and data, in accordance with the embodiments of the present disclosure. These program instructions and data need not always be digital or composed in any high-level programming language. Rather, the program instructions may be any set of signal-producing or signal-altering circuitry or media that may be capable of performing functions, described in the present disclosure. Additionally, the server 120 may include other hardware, software, and firmware components that are commonly present in devices configured as servers and communicating with devices, such as the gateway 115. With respect to the communication link 170, that communication link may be similar to the communication links 165 to the extent that those interfaces are suitable for communication between the gateway 115 and the server 120. Other types of communication channels may be used as well.

As shown in FIG. 1, the augmented reality system 100 includes the drones 125. In an illustrative embodiment, the drones 125 can be unmanned aerial vehicles (UAV), which are small aircrafts configured to be programmed and remotely operated by an operator to carry out one or more functions. In an alternative embodiment, any other suitable means for collecting images and sensor data may be used, such as terrestrial drones, fixed location devices (e.g., that communicate with the sensors 110), handheld devices, etc. In an illustrative embodiment, the drones 125 can be used to capture live videos and images of the building 105 in the event of a fire in the building and transmit those videos and images to a drone operator, the emergency response center, the server 120, or a combination thereof. The images can be used, for example, to devise an emergency rescue plan. To capture the videos and images of the building 105, each of the drones 125 has installed thereon a camera 175. The camera 175 may be configured to be controlled by the drones 125 and/or by the operator(s) controlling the drones.

The camera 175 can be configured to capture images. In some embodiments, the camera 175 can capture two-dimensional images. In other embodiments, the camera 175 can capture three-dimensional images. In an illustrative embodiment, the camera 175 can capture videos. In an illustrative embodiment, the camera 175 can be a still-image camera, a video camera, or any type of camera suitable for capturing high resolution aerial imagery. Furthermore, the camera 175 can be configured to capture color images, black-and-white images, filtered images (e.g., a sepia filter, a color filter, a blurring filter, etc.), images captured through one or more lenses (e.g., a magnification lens, a wide angle lens, etc.), etc. In some embodiments, camera 175 (or the drones 125 or the operator(s) of the drones) can modify one or more image settings or features, such as color, contrast, brightness, white scale, saturation, sharpness, etc. In an illustrative embodiment, the camera 175 captures infrared images or high resolution images in low light. For example, the camera 175 can be a thermal imaging camera.

The drones 125 can communicate via a communication network (not shown) that facilitates the videos/images captured by the camera 175 of the drones being transmitted to the monitoring computer 130 in real time. For example, the drones 125 can communicate via wireless communications with the monitoring computer 130.

Although not shown in FIG. 1, the drones 125 can have all the components that are commonly found in drones. For example, the drones 125 may have one or more motors, rotors, wings, sensors, computers, power supplies, actuators, software, etc. All such components and other elements commonly found in drones are contemplated and considered within the scope of the present disclosure.

In the event of an undesirable condition such as a fire, the emergency response crew (e.g., fire fighters) may release the drones 125 around the building 105. In some embodiments, one instance of the drones 125 is released for each side of the building. For example, five of the drones 125 are released—one each for the four sides of the building 105 and one for the roof. In other embodiments, multiple drones (e.g., the drones 125) for each side or roof of the building 105 may be used. Alternatively, fewer than five drones may be used around the building 105. In an illustrative embodiment, the drones 125 are arranged around the building 105 after being released and capture videos and images of the building and transmits those videos and images to the emergency response crew.

The emergency response crew is able to view the sensor data from the sensors 135, 140, 145, 150, 155, and 160 via the monitoring computer 130. The emergency response crew can receive the data from the sensors 135, 140, 145, 150, 155, and 160 either directly through the sensors, through the gateway 115, and/or through the server 120. In some embodiments, the drones 125 receive the sensor data from the sensors 135, 140, 145, 150, 155, and 160 (e.g., either directly from the sensors 110, the gateway 115, and/or the server 120). Upon receiving the videos/images and the sensor data from the drones 125, the sensor data is overlaid on the videos/images to obtain an augmented view of the building 105.

For example, during a fire, the augmented view may provide intelligence to the emergency response crew regarding the layout of the building 105, whether any people or pets are inside the building, where the fire is concentrated, how the fire is spreading, which entryways would be best for the emergency crew to use for entering the building, etc. The emergency response crew can use this information to devise an action plan intelligently and to effectuate the plan most effectively and quickly. After the fire, the augmented view may provide data to help the emergency response crew determine the cause of fire or events that occurred during the fire. For example, the emergency response crew (or other personnel) may review the sensor data from the sensors 135, 140, 145, 150, 155, and 160 to identify a room or area of the building 105 that first reported higher temperatures associated with fires and/or smoke. The emergency response crew (or other personnel) may use data from the other sensors or investigate in the identified room or area of the building 105 to determine the exact cause of fire.

In an illustrative embodiment, the sensors 135, 140, 145, 150, 155, and 160 transmit unencrypted data using an omnidirectional antenna. For example, the sensors 135, 140, 145, 150, 155, and 160 can transmit via Wi-Fi or Bluetooth®. The drones 125 can each be able to receive the communications from the sensors 135, 140, 145, 150, 155, and 160. For example, each of the sensors 135, 140, 145, 150, 155, and 160 can broadcast a signal at regular intervals. Each signal can include identification information of the respective sensor 135, 140, 145, 150, 155, and 160 and an indication of the sensed condition (e.g., a temperature, a humidity level, an amount of carbon monoxide, etc.). The drones 125 can receive the broadcasted information and transmit the information to the monitoring computer 130. For example, the drones 125 can be arranged around the building 105 such that at least one of the drones 125 is in communication range with each of the sensors 110 in the building 105. In alternative embodiments, the drones 125 may be arranged around the building 105 to be in communication range with as many of the sensors 110 as practical. For example, when one or more of the sensors 110 are located in the center of the basement, those sensor(s) may not have enough transmitting power to transmit a signal to the drones 125.

In an illustrative embodiment, the monitoring computer 130 receives the sensor data and images from the drones 125 and generates an augmented view of the building. For example, the monitoring computer 130 can generate a three-dimensional environment of the building using images (e.g., real-time images) from the drones 125. Overlaid or otherwise embedded into the environment can be sensor data. For example, the monitoring computer 130 can receive a floor-plan of the building (e.g., from the server 120). The sensor data can be displayed on the floorplan corresponding to the room or area that the data corresponds to. For example, a temperature sensor in a master bedroom can be displayed on the floorplan or a three-dimensional representation of the floorplan at the location of the master bedroom.

Figure 2:
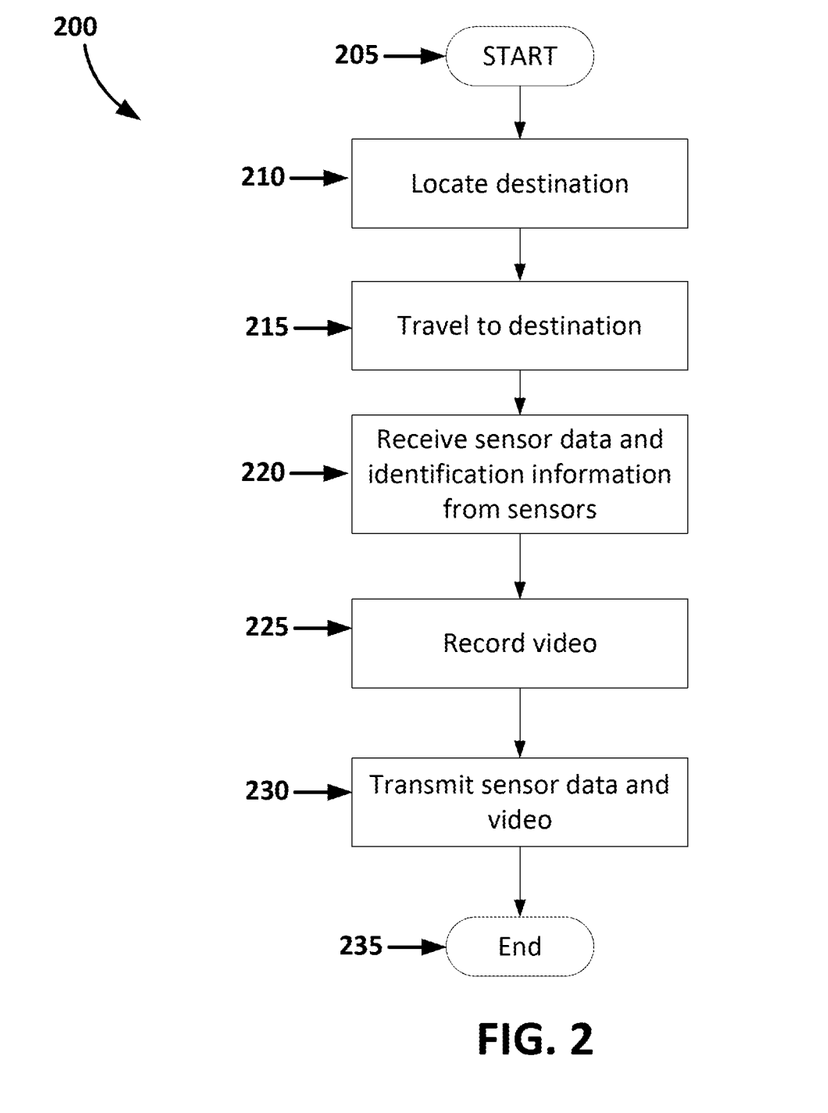
FIG. 2 is a flowchart of a method for monitoring conditions of a building, in accordance with at least some embodiments of the present disclosure.

FIG. 2 is a flowchart of a method of monitoring conditions of a building, in accordance with at least some embodiments of the present disclosure. As discussed above, the augmented reality system 100 includes one or more drones (e.g., the drones 125) that an emergency response crew (e.g., fire fighters) can release around the building 105 when the building catches fire. The drones 125 can capture live stream videos and images of the building (e.g., the building 105) and send the videos and images to the monitoring computer 130. The drones 125 can gather sensor data from one or more of the sensors 135, 140, 145, 150, 155, and 160 and transmit the sensor data to the monitoring computer 130.

In a step 205, the method 200 is initiated. For example, in response to an undesirable condition (e.g., a building fire, a burglary, etc.), drones such as the drones 125 can be released. In an illustrative embodiment, an occupant or observer of the building may report the undesirable condition to an emergency response center (e.g., fire station or 911 operator). Alternatively or additionally, the gateway 115 and/or the server 120 may determine that the undesirable condition exists within the building 105 based on sensor data received from the sensors 135, 140, 145, 150, 155, and 160 and automatically notify the emergency response center. Upon arrival of the emergency response crew from the emergency response center at the building 105, the crew releases the drones 125 around the building. In an illustrative embodiment, before releasing the drones 125 around the building 105, the drones are programmed to capture videos and images of the building 105 from multiple directions and angles and to receive information transmitted by the sensors 135, 140, 145, 150, 155, and 160. For example, the emergency response crew can program the drones 125 either at the site of the building 105 or while en route to the building 105.

In an illustrative embodiment, once at the building 105, the emergency response crew releases the programmed drones 125. The number of the drones 125 that are released may vary from embodiment to embodiment depending upon the size, height, and other features of the building 105, as well as the size or location of the undesirable conditions.

At a step 210, a destination of each of the drones 125 is located. For example, each of the drones 125 can receive from the monitoring computer 130 a location to travel to. In such an embodiment, the monitoring computer 130 can determine the location that the drones 125 should travel to from information available from the Internet (e.g., online maps or databases) or from the server 120. For example, the monitoring computer 130 can determine that the drones 125 should be spread around the building 105 in a manner that puts the drones 125 within communication distance to as many sensors 110 as possible while maintaining a safe distance (e.g., far enough away from a fire).

After being released, the drones 125 travel to their assigned areas of the building 105 at a step 215. Thus, based upon their assignment, the drones 125 travel to the roof, sides, or the corners of the building 105. In some embodiments, the drones 125 may be programmed to just hover over their assigned areas, while in other embodiments, the drones may be programmed to continuously fly around the building (or their assigned area of the building) to capture videos and images. In addition to traveling to their assigned area of the building to capture videos and/or images, at step 220, the drones 125 may receive sensor data from the sensors 135, 140, 145, 150, 155, and 160 that are within the building 105.

In some embodiments, the drones 125 have the capability to directly connect to one or more of the sensors 135, 140, 145, 150, 155, and 160, the gateway 115, and the server 120 to get the sensor data. In an illustrative embodiment, the drones 125 may be programmed to overlay the sensor data over the captured videos and/or images to create the augmented view and transmit the augmented view to the monitoring computer 130. For example, in an illustrative embodiment, the drones 125 can determine a location of the sensors 135, 140, 145, 150, 155, and 160 based on a signal received from those sensors. In an illustrative embodiment, a signal strength of the sensors 135, 140, 145, 150, 155, and 160 from each of two or more of the drones 125 can be used to determine a location of the sensor 110 (e.g., biangulation, triangulation, etc.) In an illustrative embodiment, the drones 125 can continuously update the augmented view with the updated sensor data and the live recorded videos and/or images. Thus, the drones 125 can provide a real-time (or substantially real-time) augmented view of the building 105 and of the fire engulfing the building.

The drones 125 record videos and/or images of the building 105 at step 225. In an illustrative embodiment, after recording the videos and/or images, the drones 125 can create an augmented view of the building by overlaying sensor data onto the recorded video or images. At step 230, the drones transmit the received sensor data and the recorded images/video to the monitoring computer 130. In embodiments in which the drones 125 generate the augmented view, the augmented view is transmitted to the monitoring computer 130. In other embodiments, the drones 125 may not receive any sensor data at the step 220. In such embodiments, the step 220 is skipped and the drones capture the videos and/or images at the step 215 and transmit those videos/images back to the monitoring computer 130 at the step 230. In such an embodiment, the monitoring computer can receive sensor information from, for example, the server 120 (or the gateway 115) and generate an augmented view using the images from the drones 125 and the sensor information from the sensors 135, 140, 145, 150, 155, and 160. The monitoring computer 130 can receive the videos, images, and/or the augmented view from the drones 125 and display the information for viewing by emergency personnel.

In an illustrative embodiment, the drones 125 continue to transmit information (e.g., the videos, images, and/or the augmented view) until the monitoring computer 130 directs the drones to stop receiving the information. The process 200 then ends at a step 235 with the drones ceasing to capture videos and/or images and traveling back to the emergency response crew.

Figure 3:
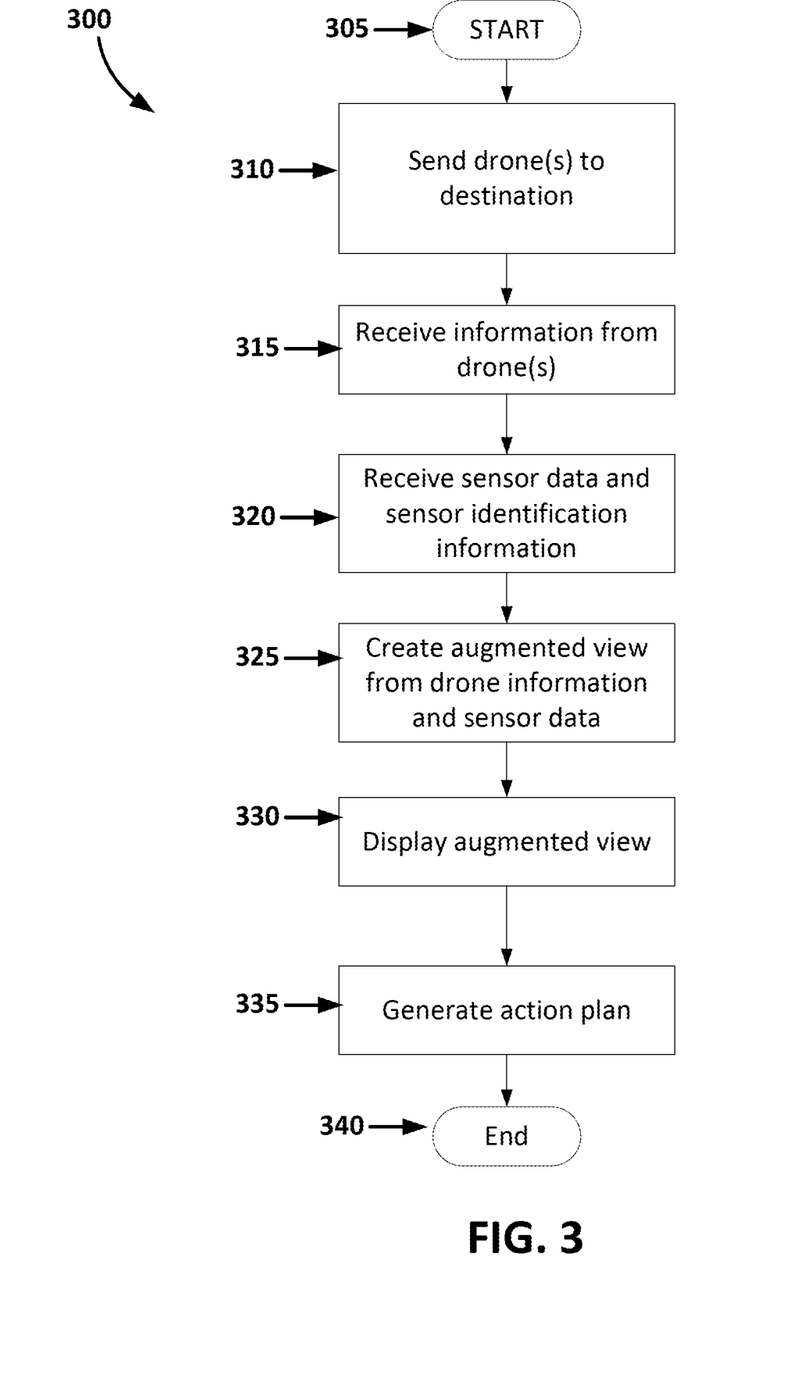
FIG. 3 is a flowchart of a method for generating an augmented reality of a building, in accordance with at least some embodiments of the present disclosure.

Referring now to FIG. 3, a flowchart outlining a process 300 for generating an augmented view on the monitoring computer 130 is shown, in accordance with at least some embodiments of the present disclosure. The process 300 is initiated at a step 305 with the building 105 catching fire (or another undesirable condition), the emergency response crew being informed of the fire, and the emergency response crew traveling to the location of the building. At the location of the building 105, the emergency response crew sends out the drones 125 in an operation 310. As briefly discussed above, the emergency response crew can program the drones 125 before releasing them around the building 105.

For example, the emergency response crew programs the drones 125 with a variety of information using the monitoring computer 130. In one example, the drones 125 are programmed with the location of the building 105. Upon arrival or en route to the building 105, the emergency response crew programs the drones 125 with the location of the building 105. The location may include the GPS coordinates of the building 105 obtained from a sensor within the building that transmits location of the building, the gateway 115, the server 120, or from any other source (e.g., a location provided by a caller who called in an emergency to 911). The location may also include the foot print (e.g., square footage) of the building 105, address, street intersections, any specific geographical or environmental conditions that may be relevant, physical structures or topology around the building, any peculiarities in the shape of the building, height of the building, and any other information that the drones 125 may find useful in navigating, flying, and/or hovering around the building to capture videos and images in a safe and efficient manner. The emergency response crew may also get the information relating to the building 105 by connecting to the Internet.

The emergency response crew may also program the drones 125 by sending sensor data from the sensors 135, 140, 145, 150, 155, and 160 to the drones (if, for example, the drones do not have the capability to connect with the sensors 135, 140, 145, 150, 155, and 160, the gateway 115, and/or the server 120). The emergency response crew may also program the drones 125 with indications of whether to record videos, images, or both, as well as whether to record continuously or periodically, whether to transmit the videos/images in real-time or periodically, whether to hover around a particular area of the building or fly around the building, assigned area(s) of the building to capture videos/images, how high or how further away from the building 105 to captures videos/images from, from what angles and directions to capture, etc.

Information specific to the building 105, such as, the height and footprint of the building, floor-plan of the building, etc. may be pre-determined and pre-stored in the server 120 and, in some embodiments, the gateway 115. The server 120 and/or the gateway 115 may also include other information about the building 105 that the monitoring computer 130 may access, such as the age of the building, any hazardous material in the building, any specific material used in the construction of the building, any specific fire safety features that the building has, and any other feature that may aid the emergency response crew in devising the action plan. The gateway 115 and/or the server 120 may also have stored thereon a layout or floor plan of the building 105, which the emergency response crew may download (e.g., access) and get acquainted with before devising the emergency action plan. The emergency response crew may be able to simply connect to the server 120 (and/or to the gateway 115 if the gateway is within a connection range) and download the location and building information for programming the drones 125.

After programming the drones 125 and releasing the drones to capture videos/images of the building 105, the drones may start capturing imagery of the building. This imagery, which can include videos and/or images, is transmitted to the emergency response crew at a step 315. As discussed above, the imagery transmitted by the drones 125 may include raw videos/images that the drones 125 capture or, in some embodiments, an augmented view including the sensor data from the sensors 135, 140, 145, 150, 155, and 160 in the videos/images. In addition to receiving the imagery from the drones 125, the monitoring computer 130 receives the sensor data from the sensors 135, 140, 145, 150, 155, and 160 at a step 320. In some embodiments, if the monitoring computer 130 is unable to connect to the sensors 135, 140, 145, 150, 155, and 160, the gateway 115, or the server 120, the monitoring computer may receive the sensor data from the drones 125. The monitoring computer 130 may also be configured to receive sensor data on demand, while in other embodiments, the monitoring computer 130 may continuously receive sensor data as new data is reported.

In yet other embodiments, such as when the sensor data is only periodically updated and transmitted to the monitoring computer 130, the monitoring computer may be configured to receive sensor data on demand. Thus, the monitoring computer 130 may be configured to receive sensor data both automatically and on demand. For on demand sensor data, the emergency response crew may choose to see a complete list of the sensors within the building 105 including a description of those sensors and the type of information those sensors relay. Based on the list of sensors (and/or the imagery received from the drones 125), the emergency response crew may identify a specific location or area of the building from which to receive more data from. If, in some instances, the location of the sensors 135, 140, 145, 150, 155, and 160 is not transmitted, the emergency response crew may use GPS/Wi-Fi triangulation to communicate with the sensors to determine their location or get the location information from the drones 125.

Once the emergency response crew has the sensor data from the sensors 135, 140, 145, 150, 155, and 160 and the imagery from all of the drones 125, the monitoring computer 130 creates an augmented view at a step 325. As discussed above, the drones 125 may have the capability to create an augmented view of the videos/images that the drone captures. If the monitoring computer 130 receives the augmented view from the drones 125, the emergency response crew can use the augmented views from all of the drones 125 to create an overall augmented view. In some embodiments, the creation of the overall augmented view happens automatically, while in other embodiments, the emergency response crew can decide which augmented views from the drones 125 to use to create the overall augmented view. In an illustrative embodiment, the emergency response crew has the ability to change the sensor information that is visible on the overall augmented view. For example, the emergency response crew can drag and drop sensors onto the imagery from the drones 125 to see the information reported by those particular sensors. Likewise, the emergency response crew can remove sensor information from the overall augmented view if that sensor information is not deemed relevant. The emergency response crew can view and change the augmented reality view using the monitoring computer 130.

The overall augmented view can be displayed on a user interface of the monitoring computer 130 for review. The overall augmented view, in some embodiments, automatically provides suggestions for an action plan. For example, the augmented view may reveal that there are people or pets trapped inside the building 105 (e.g., via occupancy sensors). The augmented view may also reveal the best or closest and safest ways to extract the people/pets from the building 105 with minimal injuries to the emergency response crew. The augmented view may also make suggestions as to fire spreading patterns, which areas of the building 105 are particularly vulnerable for explosions (e.g., by virtue of having explosive devices or equipment in those areas), and so on. Based on all the suggestions from the overall augmented view, the emergency response crew and/or the monitoring computer 130 can devise an action plan at step 335.

The emergency response crew and/or the monitoring computer 130 may continuously revise and refine the action plan based on the sensor data from the sensors 135, 140, 145, 150, 155, and 160 and the imagery from the drones 125. The process 300 then ends at step 340 with the emergency response crew extinguishing the fire in the building 105 and/or completing any rescuing operations for rescuing occupants/property from inside the building.

Figure 4:
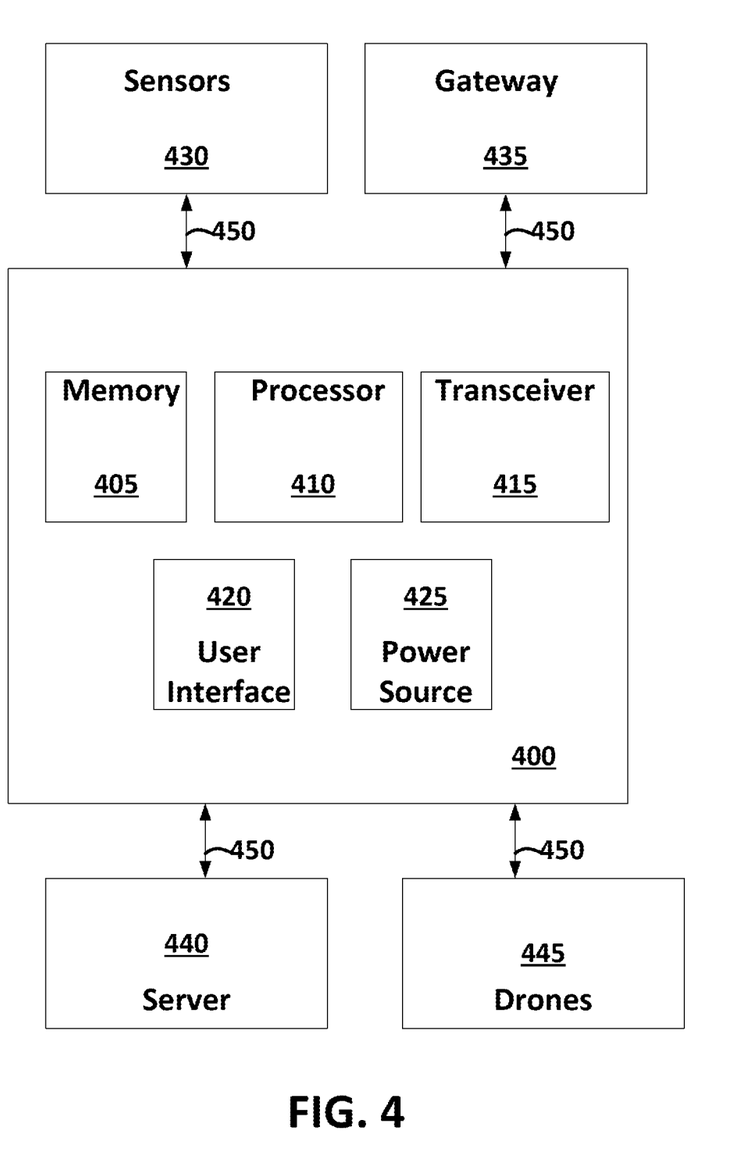
FIG. 4 is a block diagram of a computer system, in accordance with at least some embodiments of the present disclosure.

Turning now to FIG. 4, an illustrative monitoring computer 400 is shown, in accordance with at least some embodiments of the present disclosure. The monitoring computer 400 is similar to the monitoring computer 130 of FIG. 1. The monitoring computer 400 includes, in some embodiments, a memory 405, a processor 410, a transceiver 415, a user interface 420, and a power source 425. In alternative embodiments, additional, fewer, and/or different elements may be provided within the monitoring computer 400. The monitoring computer 4000 can be a desktop computer, a laptop computer, a smartphone, another type of hand-held device, or a specialized computing device suitable for the functions described herein. The monitoring computer 400 can be used to implement one or more of the methods described herein.

In at least some embodiments, the memory 405 of the monitoring computer 400 is an electronic holding place or storage for information so that the information can be accessed by the processor 410. The memory 405 may include, but is not limited to, any type of random access memory (RAM), any type of read-only memory (ROM), dynamic random access memory (DRAM), programmable read only memory (PROM), erasable programmable read only memory (EPROM), electrically erasable programmable read only memory (EEPROM), any type of flash memory, such as magnetic storage devices (e.g., hard disk, floppy disk, magnetic strips, etc.), optical disks (e.g., compact disk (CD), digital versatile disk (DVD), etc.), smart cards, flash memory devices, etc. The monitoring computer 400 may also have one or more computer-readable media that use the same or a different memory media technology. The monitoring computer 4000 may have one or more drives that support the loading of a memory medium such as a CD, a DVD, a flash memory card, etc.

Furthermore, the memory may be in communication with the processor 410 that executes instructions. The instructions may be carried out by a special purpose computer, logic circuits, or hardware circuits. The processor 410 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processor 410 executes an instruction, meaning that it performs the operations called for by that instruction. The processor 410 operably couples with the user interface 420, the transceiver 415, the memory 405, etc. to receive, to send, and to process information and to control the operations of the monitoring computer 400. The processor 410 may retrieve a set of instructions from a permanent memory device such as a ROM device and copy the instructions in an executable form to a temporary memory device that is generally some form of RAM. The processor 410 may include multiple processors that use the same or a different processing technology. In an illustrative embodiment, the instructions may be stored in the memory 405.

With respect to the transceiver 415, the transceiver is configured to receive and/or transmit information to/from the monitoring computer 400. For example, the transceiver 415 can be configured to communicate with the drones 165, the server 155, the gateway 115, etc. In some embodiments, the transceiver 415 communicates information via a wired connection, such as an Ethernet connection, one or more twisted pair wires, coaxial cables, fiber optic cables, etc. In some embodiments, the transceiver 415 communicates information via a wireless connection using microwaves, infrared waves, radio waves, spread spectrum technologies, satellites, etc. The transceiver 415 can be configured to communicate with another device using cellular networks, local area networks, wide area networks, the Internet, etc. In some embodiments, one or more of the elements of the monitoring computer 400 communicate via wired or wireless communications. In some embodiments, the transceiver 415 provides an interface for presenting information from the monitoring computer 400 to external systems, users, or memory. For example, the transceiver 415 may include an interface to a display, a printer, a speaker, etc. In some embodiments, the transceiver 415 may also include alarm/indicator lights, a network interface, a disk drive, a computer memory device, etc. In other embodiments, the transceiver 415 can receive information from external systems, users, memory, etc.

The user interface 420, in some embodiments, is configured to receive and/or provide information from/to a user. The user(s) in this case are the emergency response crew. The user interface 420 can be any suitable user interface. The user interface 420 can be an interface for receiving user input and/or machine instructions for entry into the monitoring computer 400. The user interface 420 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, etc. to allow an external source, such as a user, to enter information into the monitoring computer 400. The user interface 420 can be used to navigate menus, adjust options, adjust settings, adjust display, etc.

The user interface 420 can be configured to provide an interface for presenting information from the monitoring computer 400 to external systems, users, memory, etc. For example, the user interface 420 can include an interface for a display, a printer, a speaker, alarm/indicator lights, a network interface, a disk drive, a computer memory device, etc. The user interface 420 can include a color display, a cathode-ray tube (CRT), a liquid crystal display (LCD), a plasma display, an organic light-emitting diode (OLED) display, etc.

Furthermore, in some embodiments, the power source 425 is configured to provide electrical power to one or more elements of the monitoring computer 130. In some embodiments, the power source 425 includes an alternating power source, such as available line voltage (e.g., 120 Volts alternating current at 60 Hertz in the United States). The power source 425 can include one or more transformers, rectifiers, etc. to convert electrical power into power useable by the one or more elements of the monitoring computer 400, such as 1.5 Volts, 8 Volts, 12 Volts, 24 Volts, etc. The power source 425 can include one or more batteries.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

Furthermore, the monitoring computer 400 is configured to communicate with sensors 430, gateway 435, server 440, and drones 445. The sensors 430 are equivalent to the sensors 110 and specifically the sensors 135, 140, 145, 150, 155, and 160. Likewise, the gateway 435 is similar to the gateway 115, the server 440 is similar to the server 120, and the drones 445 are similar to the drones 125. The monitoring computer 400 is configured to receive sensor data from the sensors 430, the gateway 435, and the server 440, as well as captured videos and/or images from the drones 445. The monitoring computer 4000 is configured to receive information from and send information to the sensors 430, the gateway 435, the server 440, and the drones 445 via communication links 450. The communication links 450 are similar to the communication links 165 and 170 of FIG. 1. By virtue of communicating with the sensors 430, the gateway 435, the server 440, and the drones 445, the monitoring computer 400 (e.g., the processor 410 of the device) can create an augmented view from the sensor data of the sensors 430 and the videos/images transmitted by the drones 445. The augmented view can be viewed on the user interface 420.

While the present disclosure has been described from the perspective of a burning building, concepts of the present disclosure may be used in other cases as well. For example, features of this disclosure may be used for handling burglaries, to track burglars within a structure, to facilitate rescue operations in other natural disasters, to monitor an active shooter and the occupants inside, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An augmented reality system, the system comprising:
  a monitoring computer configured to receive information regarding a monitored structure, the information comprising a building layout; and
  a self-propelled monitoring device communicatively coupled to the monitoring computer, wherein the self-propelled monitoring device is configured to:
    receive, from the monitoring computer, instructions to monitor an assigned area associated with the monitored structure;
    in response to the instructions, travel to the assigned area;
    receive sensor data from one or more of the building sensors comprised by the monitored structure, further receiving data comprising sensor location data;
    determine one or more vantage points from which to monitor the assigned area based on received sensor data from at least one of the building sensors;
    travel to at least one of the vantage points; and
    capture image data of the assigned area associated with the monitored structure;
  wherein the self-propelled monitoring device is further configured to create an augmented view of the monitored structure, wherein the augmented view selectively incorporates the building layout, the image data of the assigned area, and the sensor data from the one or more building sensors, the augmented view further incorporating an indication of whether the monitored structure is occupied;
  the self-propelled monitoring device further configured to:
    display in the augmented view, a suggested method of evacuating occupants of the monitored structure using sensor data and location data associated with the one or more building sensors.

2. The system of claim 1, wherein the monitoring computer is communicatively coupled to a server, and wherein the monitoring computer is configured to receive layout information for the monitored structure from the server.

3. The system of claim 2, wherein one of the monitoring computer and the self-propelled monitoring device is configured to determine the instructions to travel to the vantage point based on the layout information received from the server.

4. The system of claim 1, further comprising the one or more building sensors, wherein the one or more building sensors are configured to broadcast the sensor data as a signal at regular intervals, and wherein the signal comprises identification information for each of the one or more building sensors and data indicative a sensed condition.

5. The system of claim 1, wherein the self-propelled monitoring device comprises an aerial drone.

6. The system of claim 1, wherein the sensed environment associated with the structure comprises at least one of a safety of the vantage point, an availability of the sensor data from the vantage point, and an availability of the image data from the vantage point; and wherein the image data of the monitored structure comprises real-time video.

7. The system of claim 1, wherein the self-propelled monitoring device is further configured to at least one of:
(a) determine the sensed environment based on the received sensor data from the one or more building sensors; or
(b) monitor at least one of the structure and surroundings of the structure to determine the sensed environment.

8. The system of claim 7, wherein the self-propelled monitoring device is further configured to:
receive building data representing building shape, height, and structures or topology around the building; and
determine the one or more vantage points based on the received sensor and building data.

9. A method of monitoring a structure with an augmented reality system, the method comprising:
receiving, at a self-propelled monitoring device, instructions to monitor an assigned area associated with a monitored structure;
in response to the instructions to monitor the assigned area, the self-propelled monitoring device traveling to the assigned area;
receiving directly from one or more building sensors associated with the assigned area, by the self-propelled monitoring device, sensor data, further receiving sensor location data for the one or more building sensors;
determining one or more vantage points from which to monitor the assigned area, the determination based on the received sensor data;
capturing, by the self-propelled monitoring device, image data of the assigned area from at least one of the vantage points;
generating a suggested method of evacuating occupants of the monitored structure using sensor data and sensor location data associated with the one or more building sensors; and
creating, by the self-propelled monitoring device, an augmented view of the monitored structure, wherein the augmented view incorporates, occupancy data, the image data of the assigned area, a building layout, the sensor data from the one or more building sensors, and the suggested method of evacuating occupants.

10. The method of claim 9, wherein the self-propelled monitoring device comprises an aerial drone.

11. The method of claim 9, wherein determining the one or more vantage points is based on a safety of the vantage point, an availability of sensor data from the vantage point, and an availability of image data from the vantage point; and
wherein the image data of the monitored structure comprises at least one of real-time video and one or more still images.

12. The method of claim 9, wherein creating the augmented view of the monitored structure comprises selectively overlaying at least a portion of the sensor data on the image data of the monitored structure.

13. The method of claim 9, wherein the sensor data comprises broadcast information comprising at least one of temperature, humidity level, a level of smoke obscuration, or an amount of carbon monoxide, an identity code associated with each of the respective building sensors, and location information for each of the respective building sensors.

14. The method of claim 9, further comprising transmitting the augmented view to a monitoring computer for display.

15. A method of monitoring a structure with an augmented reality system, the method comprising:
transmitting, by a monitoring computer to a self-propelled monitoring device, instructions to monitor an assigned area associated with a monitored structure;
traveling, by the self-propelled monitoring device, to the assigned area;
receiving, by the self-propelled monitoring device directly from one or more building sensors located proximately to the assigned area, sensor data, further receiving sensor location data;
receiving, by the monitoring computer from the self-propelled monitoring device, the sensor data from one or more building sensors associated with the assigned area;
determining one or more a vantage points from which to monitor the assigned area based on the sensor data from one or more building sensors associated with the assigned area;
receiving, by the monitoring computer from the self-propelled monitoring device, image data of the assigned area;
creating, by the monitoring computer, an augmented view of the monitored structure, wherein the augmented view selectively incorporates the image data of the assigned area, a floorplan of the structure, and the sensor data from the one or more of the building sensors;
determining the severity of a hazardous condition using sensor data and image data and detecting a rate of spread of the hazardous condition; and
generating a suggested method of evacuating occupants of the monitored structure using the determined severity of the hazardous condition, sensor data, and sensor location data associated with the one or more building sensors; and
displaying in the augmented view of the monitored structure, the suggested method of evacuating occupants of the monitored structure.

16. The method of claim 15, wherein the sensor data comprises broadcast information comprising at least one of temperature, humidity level, a level of smoke obscuration, or an amount of carbon monoxide, an identity code associated with each of the respective building sensors, and location data for each of the respective building sensors.

17. The method of claim 15, further comprising:
receiving, by the monitoring computer, information regarding a layout of the monitored structure; and
determining the instructions to travel to the destination based on the information regarding the layout of the monitoring structure.

18. The method of claim 15, further comprising:
displaying, by the monitoring computer, a list of the one or more building sensors;
receiving, at the monitoring computer, a selection of a specific location within the monitored structure from which to receive additional data; and
presenting, by the monitoring computer, additional information regarding the specific location in response to the selection of the specific location.

19. The method of claim 15, further comprising determining and presenting, by the monitoring computer, a proposed action plan concurrently with the augmented view.

20. The method of claim 15, wherein the self-propelled monitoring device comprises at least one of an aerial drone and a terrestrial drone.

21. The method of claim 15, wherein the augmented view comprises image data of the monitored structure having the sensor data overlaid thereon.

* * * * *